(12) United States Patent
Sonderegger

(10) Patent No.: US 10,328,790 B2
(45) Date of Patent: Jun. 25, 2019

(54) SAFETY ARRANGEMENT FOR A VEHICLE TANK

(71) Applicant: VOLVO TRUCK CORPORATION, Göteborg (SE)

(72) Inventor: Sigurd Sonderegger, Askim (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/319,550

(22) PCT Filed: Jun. 18, 2014

(86) PCT No.: PCT/SE2014/000084
§ 371 (c)(1),
(2) Date: Dec. 16, 2016

(87) PCT Pub. No.: WO2015/195001
PCT Pub. Date: Dec. 23, 2015

(65) Prior Publication Data
US 2017/0144535 A1  May 25, 2017

(51) Int. Cl.
*F17C 13/04* (2006.01)
*B60K 15/03* (2006.01)
(Continued)

(52) U.S. Cl.
CPC ...... *B60K 15/03006* (2013.01); *B60K 15/035* (2013.01); *B60K 15/063* (2013.01);
(Continued)

(58) Field of Classification Search
CPC ............ B60K 15/03006; B60K 15/035; B60K 15/063; B60K 2015/03296;
(Continued)

(56) References Cited

U.S. PATENT DOCUMENTS 2,489,787 A    11/1949  Knowlton
3,277,912 A *  10/1966  Melzer .................... F16K 17/14
                                                                    137/73
(Continued)

FOREIGN PATENT DOCUMENTS

CN        201274989 Y     7/2009
EP          1070620 A2    1/2001
(Continued)

OTHER PUBLICATIONS

European Search Report (dated Mar. 19, 2018) for corresponding European App. EP 14 89 4943.
(Continued)

*Primary Examiner* — P. Macade Nichols
(74) *Attorney, Agent, or Firm* — WRB-IP LLP

(57) ABSTRACT

A safety arrangement for a DME fuel tank of a vehicle, adapted to release an excessive pressure from the fuel tank, including a spring-loaded pressure release valve adapted to open at a predefined pressure level, where the safety arrangement further includes a housing mounted on the fuel tank and having an outer opening closed by a lid, where the pressure release valve is arranged in the housing and where the housing is provided with an outlet pipe having an outlet opening, and where the lid is adapted to melt at a predefined temperature, thereby allowing gas to exit the pressure release valve through the outer opening of the housing when the pressure release valve is open and the lid has melted. A small gas leakage caused by an excessive pressure can be discharged downwards through the outlet pipe and outlet opening towards the ground, and a large gas leakage, caused by e.g. a fire, can be discharged outwards from the fuel tank, away from the fire.

13 Claims, 3 Drawing Sheets

(51) Int. Cl.
  *B60K 15/035* (2006.01)
  *B60K 15/063* (2006.01)
  *F17C 1/00* (2006.01)
  *F17C 13/12* (2006.01)
  *B60K 15/067* (2006.01)

(52) U.S. Cl.
  CPC .............. *F17C 1/005* (2013.01); *F17C 13/04* (2013.01); *F17C 13/12* (2013.01); *B60K 15/067* (2013.01); *B60K 2015/03026* (2013.01); *B60K 2015/03296* (2013.01); *B60K 2015/03523* (2013.01); *B60K 2015/03585* (2013.01); *B60K 2015/0636* (2013.01); *F17C 2201/0119* (2013.01); *F17C 2205/0317* (2013.01); *F17C 2205/0332* (2013.01); *F17C 2205/0394* (2013.01); *F17C 2221/032* (2013.01); *F17C 2260/042* (2013.01); *F17C 2265/066* (2013.01)

(58) Field of Classification Search
  CPC ........... B60K 2015/03523; B60K 2015/03585; B60K 2015/0636; F17C 5/03296; F17C 1/005; F17C 13/04; F17C 13/12
  USPC ...................................... 137/73, 67
  See application file for complete search history.

(56) References Cited

U.S. PATENT DOCUMENTS

| 3,885,589 | A | * | 5/1975 | Iung | ..................... | F16K 1/306 |
| | | | | | | 137/505.35 |
| 4,457,329 | A | * | 7/1984 | Werley | ................. | F16K 17/383 |
| | | | | | | 137/505.42 |
| 4,458,711 | A | * | 7/1984 | Flider | ................... | F16K 17/196 |
| | | | | | | 137/73 |
| 4,619,434 | A | * | 10/1986 | Snyder | ................. | F16K 17/383 |
| | | | | | | 137/72 |
| 2011/0180551 | A1 | | 7/2011 | Handa | | |
| 2016/0040796 | A1 | * | 2/2016 | Omesti | ................... | F16K 17/38 |
| | | | | | | 137/68.23 |

FOREIGN PATENT DOCUMENTS

| EP | 1591704 A1 | 11/2005 |
| JP | 2007112180 A | 5/2007 |
| JP | 2009210026 A | 9/2009 |

OTHER PUBLICATIONS

International Search Report (dated Mar. 12, 2015) for corresponding International App. PCT/SE2014/000084.
Chinese Official Action (dated Aug. 24, 2018) for corresponding Chinese App. 201480079981.1.

* cited by examiner

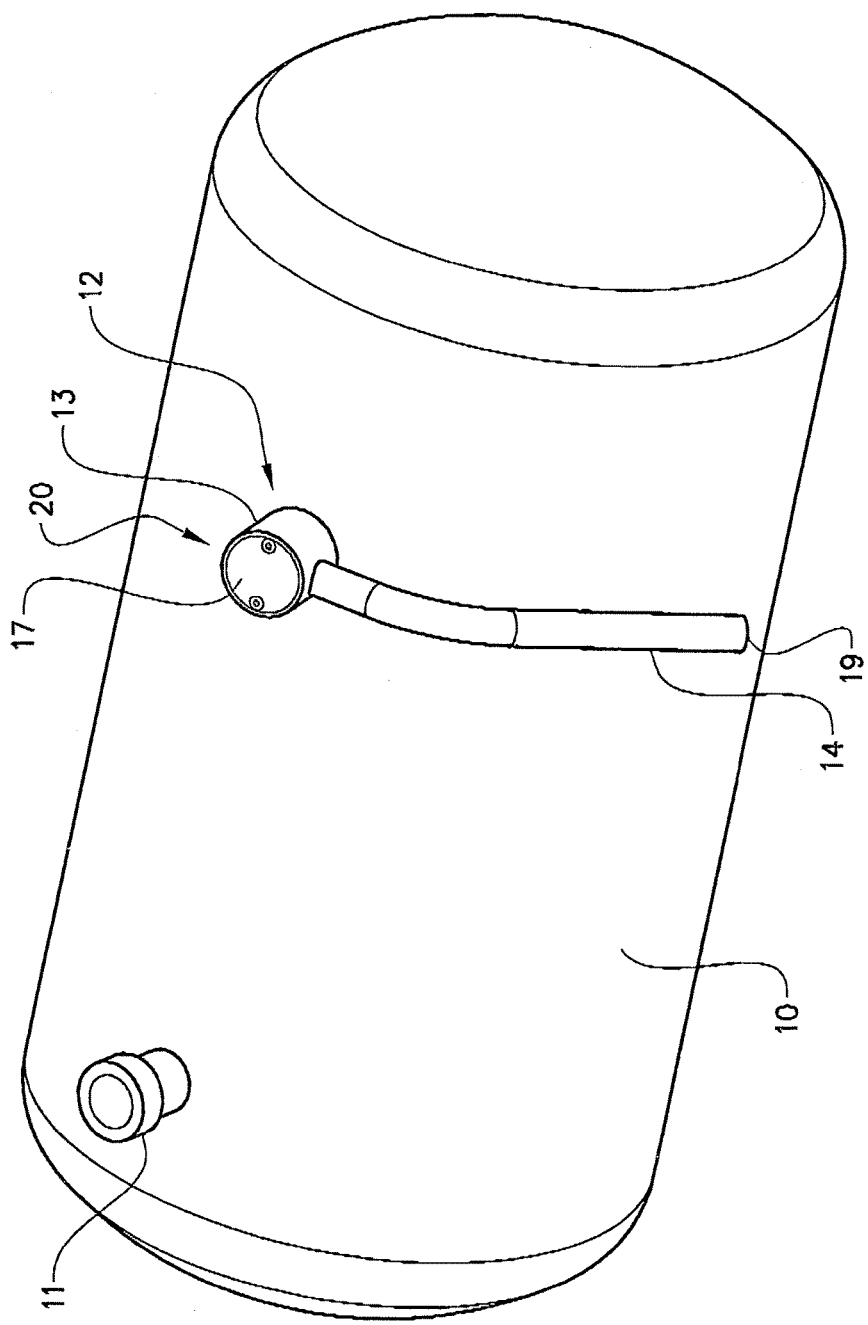

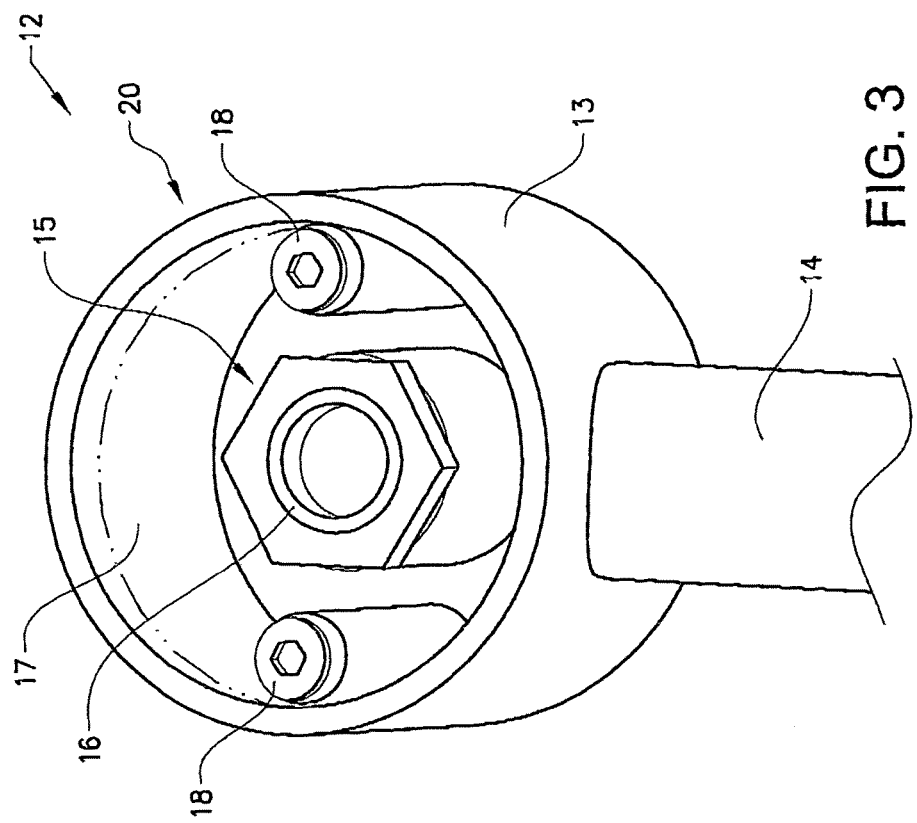

SAFETY ARRANGEMENT FOR A VEHICLE TANK

BACKGROUND AND SUMMARY

The present invention relates to a safety arrangement for a liquefied gas fuel tank, which is adapted to release an excessive pressure in a safe way. The safety arrangement is especially suitable for use with DME fuel.

It is becoming more and more common to use alternative fuels for vehicles, mainly due to environmental considerations. Such fuels involve among others ethanol, compressed natural gas (CNG) and liquefied petroleum gas (LPG), which are all widely used in some markets. There is also a further need to find fuels that are renewable in order to minimize the dependency on fossil fuels. One new fuel that can be produced from organic waste such as lignocellulosic biomass from e.g. the forest industry, is dimethyl ether or DME. DME is a gas which will be liquefied under pressure, just like LPG.

There are several safety regulations that govern the handling and use of fuels. For liquefied gas, where the gas often is heavier than air, extra safety measures are required for gas leakage. One regulation, ECE R67, governs the use of LPG in passenger cars. The different regulations concern among other the behaviour of a fuel tank exposed to excessive pressure or excessive temperature, which may cause severe damages to the vehicle and to the surrounding, if not handled correctly. One issue for fuel tanks containing liquefied gas is how to release gas when the fuel tank is exposed to a raised pressure, e.g. caused by sun radiation heating up the fuel tank.

It is known to use pressure release valves that open at a specific pressure level, such that the excessive pressure can be released. It is further known to use safety valves having a fusible element sensitive to heat that will open above a predefined temperature. These solutions may however not be optimal for all situations. There is thus still a need for an improved safety arrangement for a liquefied gas fuel tank, especially if the density of the gaseous fuel is higher than the density of air.

It is desirable to provide an improved safety arrangement for a liquefied gas fuel tank for a vehicle.

In a safety arrangement for a liquefied gas fuel tank of a vehicle, adapted to release an excessive pressure from the fuel tank, comprising a spring-loaded pressure release valve adapted to open at a predefined pressure level, the safety arrangement further comprises a housing mounted on the filet tank and having an outer opening closed by a lid, where the pressure release valve is arranged in the housing and where the housing is provided with an outlet pipe having an outlet opening, and where the lid is adapted to melt at a predefined temperature, thereby allowing the liquefied gas to exit the pressure release valve through the outer opening of the housing when the pressure release valve is open and the lid has melted. The liquefied gas fuel may e.g. be D E.

By this first embodiment of the safety arrangement according to the invention, the safety arrangement is adapted to allow a small controlled fuel release down to the ground from the fuel tank caused by an excessive pressure, and to allow a large fuel release in another direction when the fuel tank is exposed to excessive heat, caused e.g. by a fire. The safety arrangement is provided with an outlet pipe having an outlet opening directed downwards, towards the ground. The released fuel, which will be in the form of gas, is heavier than air which means that the gas will be discharged to the ground in a controlled way, and cannot accidentally flow towards a hot item on the vehicle.

When the fuel tank is exposed to excessive heat, e.g. if there is a fire under the vehicle, the pressure in the fuel tank will rise such that the pressure release valve will open. In this case, it is of advantage to discharge the fuel in a direction not pointing downwards towards the ground, since the fuel will catch fire. When the fuel tank is exposed to excessive heat, the amount of gas or liquid that has to be released is large. At larger fuel release rates, the fuel can be both in a gas state and in a liquid state. It is thus of advantage to direct the released fuel in a direction pointing away from the fire.

In the inventive safety arrangement, the pressure release valve is arranged in a housing. The outer opening of the housing is provided with a gas tight lid which allows small amounts of gas to be directed through an outlet pipe, and where the lid will melt at a high temperature. The gas or liquid can in this case discharge through the outer opening of the housing. Due to the high pressure, the fuel will be discharged in a jet containing both gas and liquid. By letting the fuel out in a radial direction not pointing towards the fire will prevent the fuel from adding energy to the fire.

The lid is preferably made from a transparent plastic having a relatively low melting temperature. In this way, the lid will melt when the fuel tank is exposed to excessive heat, such as from a fire. A further advantage of having a transparent lid is that it is possible to see the state of the pressure release valve. In this example, the pressure release valve is provided with a one way cap which will come off when the pressure release valve opens, e.g. to release a small amount of gas. When the excessive gas has been released, the pressure release valve will close again, but the cap will remain off.

BRIEF DESCRIPTION OF DRAWINGS

The invention will be described in greater detail in the following, with reference to the attached drawings, in which FIG. 2 shows a schematic fuel tank provided with a safety arrangement according to the invention, and FIG. 3 shows a safety arrangement according to the invention.

DETAILED DESCRIPTION

Figure 1:
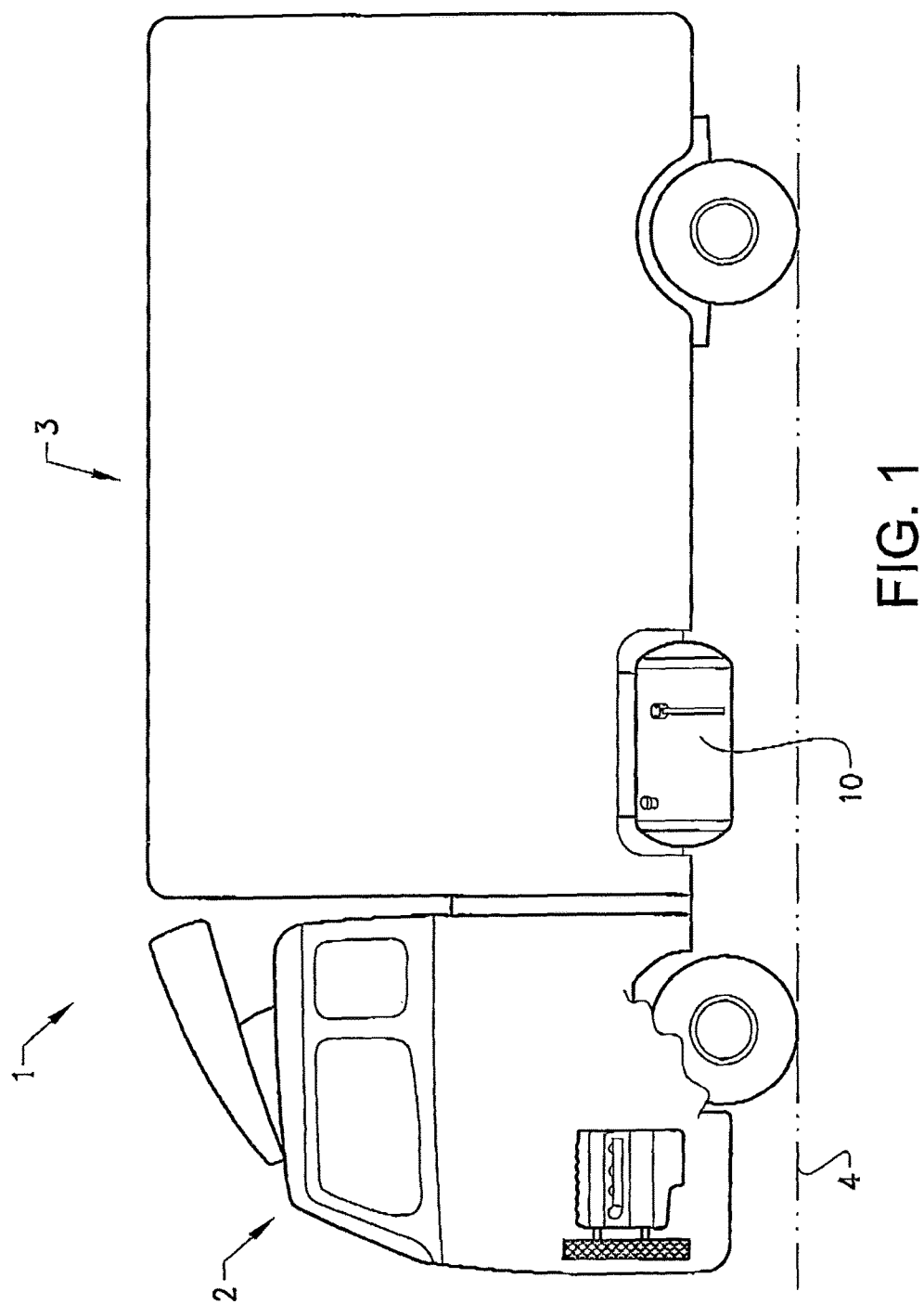
FIG. 1 shows a schematic vehicle having a fuel tank provided with a safety arrangement according to the invention.

The embodiments of the invention with further developments described in the following are to be regarded only as examples and are in no way to limit the scope of the protection provided by the patent claims.

FIG. 1 shows a schematic vehicle 1 having a cab 2 and a goods compartment 3. The vehicle 1 is standing on a ground 4. The vehicle is provided with a fuel tank 10 adapted for a liquefied gas, such as DME. The fuel tank, shown in FIG. 2, is in this example provided with a filling inlet 11 adapted for the filling of the fuel tank with fuel. The inlet is provided with a gas tight connection such that liquefied gas can be filled. It is also possible to mount the filling inlet on another position on the truck, e.g. on the chassis, and connect the filling inlet to the tank with a flexible pressure hose. The fuel tank also comprises an outlet for a fuel supply line adapted to feed fuel to the engine, and an inlet for a fuel return line from the engine (not shown). Further components that may be arranged inside, or at the fuel tank is a fuel pump, a fuel filter, an excess flow valve or a fill stop valve. The fuel tank may further be provided with one or more sensors, such as a fuel level sensor, a pressure sensor or a temperature sensor.

The fuel tank is further provided with a safety arrangement 12. It is possible to arrange more than one safety arrangement on a fuel tank. The safety arrangement is arranged above the maximal allowed fuel level of the fuel tank. The safety arrangement 12 comprises a housing 13, here in the form of a pipe shaped flange, fixedly mounted to the fuel tank, e.g. by welding, but other ways of attaching the housing to the fuel tank are also possible. The fuel tank and the housing may be made from metal or a composite material, such as a fibre-reinforced plastic. The housing is provided with an outlet pipe 14 having an outlet opening 19 directed downwards, towards the ground 4. The housing 13 is further provided with an outer opening 20 which is closed by a lid 7, where the lid is adapted to melt at a predefined temperature. The lid 17 is made from plastic, such as polycarbonate, and is in one example transparent, such that it is possible to see through the lid. The lid is preferably gas tight and is provided with a sealing ring.

FIG. 3 shows a detail of the safety arrangement 12. A pressure release valve 15 is arranged in the housing 13. The pressure release valve is adapted to open at a predefined pressure level, which preferably corresponds to safety regulations. The release pressure level may e.g. be 27 bar. The pressure release valve is spring-loaded such that it will close when the pressure decreases after the pressure release valve has opened. In such a case, small amounts of gas can be released when the pressure in the fuel tank rises above the predefined pressure. Such a situation may occur e.g. when the vehicle has been parked in the sun and the tank has warmed up such that the pressure exceeds the predefined pressure level. With a spring-loaded pressure release valve, it is secured that only a small amount of gas is released, as the resealing pressure is set at approximately 90% of the release pressure. The released gas will flow through the outlet pipe down towards the around.

It is of advantage to be able to see if the pressure release valve has been opened or not. It is thus possible to provide the pressure release valve with a cap 16, preferably red and made from plastic. The cap is mounted on the pressure release valve in a removable way, such that the cap will be pushed off when the pressure release valve opens. When the pressure release valve closes again, the cap will be off which can be detected by a driver. The lid 17 is attached to the housing with screws 18, such that the lid can be removed or replaced in an easy way. It is thus possible to remount the cap on the pressure release valve after an inspection, if the pressure release valve has opened.

When the fuel tank is exposed to excessive heat, e.g., if there is a fire under the vehicle, the pressure in the fuel tank will rise such that the pressure release valve will open. At about the same time, the lid will melt and the fuel will be discharged radially, away from the fire. The fuel is discharged through the outer opening 20 of the housing, which is now open. Since the fuel will have a high pressure, the fuel consisting of fuel both in a gas state and in a liquid state, will jet out of the tank in a direction not pointing downwards. When the fuel tank is exposed to excessive heat, the amount of gas or liquid that has to be released is large.

By the safety arrangement according to the invention, the safety arrangement will release a small amount of gas from the fuel tank caused by an excessive pressure in a controlled direction, and will release lamer amounts of fuel in a radial direction when the fuel tank is exposed to excessive heat, caused e.g. by a tire. Small amounts of fuel will be released downwards, towards the ground, which is considered to be a safe and controlled way of releasing small amounts of gas being heavier than air. Larger amounts of fuel will be jetted out radially from the fuel tank. In this way, the fuel will not reach a fire on the ground.

The invention is not to be regarded as being limited to the embodiments described above, a number of additional variants and modifications being possible within the scope of the subsequent patent claims.

REFERENCE SIGNS

1: Vehicle
2: Cab
3: Compartment
4: Ground
10 Fuel tank
11 Filling inlet
12 Safety arrangement
13 Housing
14 Outlet pipe
15 Pressure release valve
16 Cap
17 Lid
18 Screw
19 Outlet opening
20 Outer opening

The invention claimed is:

1. A safety arrangement for a liquefied gas fuel tank of a vehicle, adapted to release an excessive pressure from the fuel tank, comprising a pressure release valve adapted to open at a predefined pressure level, wherein the safety arrangement further comprises a housing mounted on the fuel tank and having an outer opening closed by a lid, where the pressure release valve is arranged in the housing and where the housing is provided with an outlet pipe having an outlet opening, and where the lid is adapted to melt at a predefined temperature, thereby allowing gas to exit the pressure release valve through the outer opening of the housing when the pressure release valve is open and the lid has melted, wherein the lid is attached to the housing with screws.

2. The safety arrangement according to claim 1, wherein the safety arrangement is mounted above a maximal fuel level of the tank.

3. The safety arrangement according to claim 1, wherein the outlet opening of the outlet pipe is directed downwards, towards the ground.

4. A safety arrangement for a liquefied gas fuel tank of a vehicle, adapted to release an excessive pressure from the fuel tank, comprising a pressure release valve adapted to open at a predefined pressure level, wherein the safety arrangement, further comprises a housing mounted on the fuel tank and having an outer opening closed by a lid, where the pressure release valve is arranged in the housing and where the housing is provided with an outlet pipe having an outlet opening, and where the lid is adapted to melt at a predefined temperature, thereby allowing gas to exit the pressure release valve through the outer opening of the housing when the pressure release valve is open and the lid has melted, wherein the safety arrangement is provided with a sealing ring between the lid and the housing.

5. The safety arrangement according to claim 1, wherein the predefined pressure level is 27 bar.

6. The safety arrangement according to claim 1, wherein the lid is made from plastic.

7. The safety arrangement according to claim 1, wherein the lid is transparent.

8. The safety arrangement according to claim 1, wherein the lid is gas tight.

9. The safety arrangement according to claim 1, wherein the lid will melt at a temperature of or above 155 degrees Celsius.

10. The safety arrangement according to claim 1, wherein the liquefied gas fuel is DME.

11. A vehicle comprising the safety arrangement according to any one of claims 1 and 4.

12. The safety arrangement according to any one of claims 1 and 4, wherein the housing is made from metal and is welded to the fuel tank.

13. A safety arrangement for a liquefied gas fuel tank of a vehicle, the liquefied gas fuel tank having a first end and an opposing second end, an axis of the liquefied gas fuel tank extending between the first end and the second end, the safety arrangement being adapted to release an excessive pressure from the liquefied gas fuel tank, comprising a pressure release valve adapted to open at a predefined pressure level, wherein the safety arrangement further comprises a housing mounted on the liquefied gas fuel tank and having an outer opening closed by a lid, where the pressure release valve is arranged in the housing and where the housing is provided with an outlet pipe having an outlet opening, and where the lid is adapted to melt at a predefined temperature, thereby allowing gas to exit the pressure release valve through the outer opening of the housing when the pressure release valve is open and the lid has melted for jetting the gas out radially relative to the axis of the liquefied gas fuel tank.

* * * * *